United States Patent
Naito et al.

(10) Patent No.: US 7,475,713 B2
(45) Date of Patent: Jan. 13, 2009

(54) TIRE/WHEEL ASSEMBLY AND NOISE REDUCTION INTERIOR MEMBER

(75) Inventors: Mitsuru Naito, Hiratsuka (JP); Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 332 days.

(21) Appl. No.: 10/542,354

(22) PCT Filed: Feb. 19, 2004

(86) PCT No.: PCT/JP2004/001910

§ 371 (c)(1),
(2), (4) Date: Jul. 14, 2005

(87) PCT Pub. No.: WO2004/074012

PCT Pub. Date: Sep. 2, 2004

(65) Prior Publication Data
US 2006/0124216 A1    Jun. 15, 2006

(30) Foreign Application Priority Data
Feb. 21, 2003 (JP) .............................. 2003-043901

(51) Int. Cl.
*B60C 5/00* (2006.01)
*B60B 21/12* (2006.01)

(52) U.S. Cl. .................................... 152/400; 152/381.5

(58) Field of Classification Search ............... 152/381.5, 152/381.6, 400, 516, 520; 301/6.91; 181/207, 181/250
See application file for complete search history.

(56) References Cited

U.S. PATENT DOCUMENTS

| 4,216,810 | A * | 8/1980 | Osada et al. ................. 152/158 |
| 5,891,278 | A * | 4/1999 | Rivin ........................... 152/418 |
| 6,463,974 | B1 * | 10/2002 | Hellweg et al. ............. 152/400 |
| 6,463,976 | B1 * | 10/2002 | Glinz et al. .................. 152/520 |
| 6,516,849 | B2 * | 2/2003 | Flament et al. .............. 152/400 |
| 6,648,421 | B1 * | 11/2003 | Akiyoshi et al. ........... 301/6.91 |
| 6,705,368 | B2 * | 3/2004 | Glinz et al. .................. 152/400 |
| 6,726,289 | B2 * | 4/2004 | Yukawa et al. ............. 301/6.91 |

(Continued)

FOREIGN PATENT DOCUMENTS

JP    56-082611 A    7/1981

(Continued)

OTHER PUBLICATIONS

PCT International Search Report for PCT/JP2004/001910 mailed on May 25, 2004.

*Primary Examiner*—Russell D Stormer
*Assistant Examiner*—Kip T Kotter
(74) *Attorney, Agent, or Firm*—Greer, Burns & Crain, Ltd.

(57) ABSTRACT

A tire/wheel assembly comprising a wheel having a rim, a pneumatic tire mounted on the rim of the wheel and a noise reduction interior member disposed in the cavity of the pneumatic tire. The noise reduction interior member includes left and right elastic rings fitted to the rim and an annular body attached between the elastic rings. The annular body is configured such that an annular cavity portion surrounded by the noise reduction interior member and the pneumatic tire has a cross-sectional area that varies in a circumferential direction of the tire.

14 Claims, 3 Drawing Sheets

U.S. PATENT DOCUMENTS

| | | | |
|---|---|---|---|
| 7,013,940 B2 * | 3/2006 | Tsihlas | 152/381.6 |
| 2006/0113018 A1 * | 6/2006 | Naito et al. | 152/400 |

FOREIGN PATENT DOCUMENTS

| | | |
|---|---|---|
| JP | 01-115704 A | 5/1989 |
| JP | 02-030704 U | 2/1990 |
| JP | 04-087803 A | 3/1992 |
| JP | 04-159101 A | 6/1992 |
| JP | 04-237606 A | 8/1992 |
| JP | 2001-113902 A | 4/2001 |
| JP | 2002-234304 A | 8/2002 |
| JP | 2004-082997 A | 3/2004 |

* cited by examiner

TIRE/WHEEL ASSEMBLY AND NOISE REDUCTION INTERIOR MEMBER

TECHNICAL FIELD

The present invention relates to tire/wheel assemblies and noise reduction interior members, and more particularly, to a tire/wheel assembly and a noise reduction interior member used therefor, which can provide improved workability of attaching the noise reduction interior member.

TECHNICAL BACKGROUND

Recently, as part of environmental measures, low noise pneumatic tires have been required in the market. To meet the requirement, for example, Unexamined Japanese Patent Application Publication No. 2001-113902 discloses such a technology that, as noise reduction interior members, protrusion members are disposed on a rim at predetermined intervals in the circumferential direction of a tire to vary the cross-sectional area of a cavity surrounded by the rim and pneumatic tire in the tire circumferential direction.

One type of noise generated by pneumatic tires is caused by resonance of the air in the cavity of the pneumatic tire during travel. As described above, by varying the cross-sectional area of the cavity in the tire circumferential direction, the frequency of the air resonance is varied to thereby reduce road noise due to the air resonance.

However, if the noise reduction interior members disposed on the rim in the tire as mentioned above are fixed to the rim in advance, assembly of the tire on the rim is obstructed. Therefore, the noise reduction interior member must be installed after one bead of the tire has been placed on the rim. This is difficult because the operator must insert his hands into the narrow space between the rim and tire. As such, attachment of the noise reduction member is difficult and inconvenient.

DISCLOSURE OF THE INVENTION

An object of the present invention is to provide a tire/wheel assembly and a noise reduction interior member used therefor, in which attachment of the noise reduction interior member can be simplified while reducing road noise caused by resonance of the air in the cavity of the pneumatic tire.

In order to achieve the above object, a tire/wheel assembly according to the present invention comprises:

a wheel having a rim;

a pneumatic tire mounted on the rim of the wheel, the pneumatic tire having a cavity; and a noise reduction interior member disposed in the cavity of the pneumatic tire, the noise reduction interior member having left and right elastic rings fitted to the rim and an annular body attached between the elastic rings, wherein the annular body is configured such that an annular cavity portion surrounded by the noise reduction interior member and the pneumatic tire has a cross-sectional area that varies in a circumferential direction of the tire.

A noise reduction interior member used for the above tire/wheel assembly of the present invention, which is to be disposed in a cavity of a pneumatic tire mounted on a rim of a wheel, comprises:

left and right elastic rings fitted to the rim; and an annular body attached between the elastic rings, wherein the annular body is configured such that an annular cavity portion surrounded by the noise reduction interior member and the pneumatic tire has a cross-sectional area that varies in a circumferential direction of the tire.

As described above, the cross-sectional area of the annular cavity portion surrounded by the noise reduction interior member and pneumatic tire varies in the tire circumferential direction, thereby allowing frequency of air resonance caused in the cavity of the pneumatic tire to vary during traveling of a vehicle. Therefore, road noise due to resonance of the air in the cavity can be reduced.

Since the elastic rings of the noise reduction interior member are fitted to the rim, the noise reduction interior member can be mounted on the rim in the normal assembly operation of a tire on a rim. Therefore, the operator does not have to insert his hands into the cavity through the narrow space between the rim and tire for fixation after assembling of the tire on the rim, consequently the process of attaching the noise reduction interior member can be greatly improved.

As described above, the uneven distribution of the openings in the equally sectioned regions allows the openings and inner cavity part to act as a Helmholtz resonator, thereby absorbing and reducing resonance of the air in the cavity of the pneumatic tire during traveling of a vehicle. Accordingly, road noise due to resonance of the air in the cavity of the pneumatic tire can be decreased. The process of attaching the noise reduction interior member significantly improved or the same reasons as previously described.

Another tire/wheel assembly according to the present invention comprises:

a wheel having a rim;

a pneumatic tire mounted on the rim of the wheel, the pneumatic tire having a cavity; and a noise reduction interior member disposed in the cavity of the pneumatic tire in such a manner that the noise reduction interior member divides the cavity of the pneumatic tire into an inner cavity part and an outer cavity part, the noise reduction interior member having left and right elastic rings fitted to the rim and an annular body attached between the elastic rings, wherein the annular body has a plurality of openings through which the inner cavity part and outer cavity part are communicatingly connected, the annular body having regions equally sectioned in a circumferential direction thereof, the plurality of openings being unevenly distributed in such a manner that the regions have openings which are different in total opening area.

Another noise reduction interior member used for another tire/wheel assembly of the present invention, which is to be disposed in a cavity of a pneumatic tire mounted on a rim of a wheel comprises:

left and right elastic rings fitted to the rim; and an annular body attached between the elastic rings, wherein the annular body has a plurality of openings, the annular body having regions equally sectioned in a circumferential direction thereof, the plurality of openings being unevenly distributed in such a manner that the regions have openings which are different in total opening area.

As described above, the uneven distribution of the openings in the equally sectioned regions allows the openings and inner cavity part to act as a Helmholtz resonator, thereby absorbing and reducing resonance of the air in the cavity of the pneumatic tire during traveling of a vehicle. Accordingly, road noise due to resonance of the air in the cavity of the pneumatic tire can be decreased. The process of attaching the noise reduction interior member is significantly improved for the same reasons as previously described.

BRIEF DESCRIPTION OF THE DRAWINGS

FIGS. 3A and 3B illustrate a tire/wheel assembly according to an alternative embodiment of the present invention, in which FIG. 3A is an enlarged cross-sectional view corresponding to FIG. 2A, and FIG. 3B is an enlarged cross-sectional view corresponding to FIG. 2B.

BEST MODES FOR CARRYING OUT THE INVENTION

Embodiments of the present invention will be described in detail below with reference to the drawings.

Figure 1:
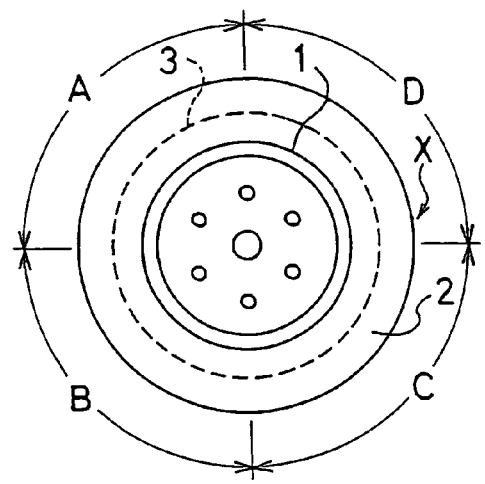
FIG. 1 is a side view showing a tire/wheel assembly according to an embodiment of the present invention.

Referring to FIGS. 1 and 2, there is shown a tire/wheel assembly according to an embodiment of the present invention, in which reference character X denotes a tire/wheel assembly, reference numeral 1 denotes a wheel, reference numeral 2 denotes a pneumatic tire, and reference numeral 3 denotes a noise reduction interior member. The wheel 1, pneumatic tire 2, and noise reduction interior member 3 are arranged in coaxial alignment with each other with respect to the axis of rotation of the wheel to be in the form of an annulus, which has an arrangement such that the noise reduction interior member 3 is placed in the cavity 2A of the pneumatic tire 2 mounted on the rim 1A of the wheel 1.

The noise reduction interior member 3 comprises left and right elastic rings 4 mounted on the rim 1A, and an annular body 5 securely attached between the elastic rings 4. The elastic rings 4, which are formed of an elastic material such as rubber or elastic resin, have an inner diameter which is formed to be substantially equal in size to the inner diameter of the bead portions 2b of the pneumatic tire 2, and are fittable to the rim 1A.

The rubber or elastic resin used to constitute the elastic rings 4 may be any kind of rubber or elastic resin if the annular body 5 can stably be supported. The rubber may be, for example, natural rubber, isoprene rubber, styrene-butadiene rubber, butadiene rubber, or butyl rubber, and the elastic resin may be, for example, resin foam such as foamed polyurethane.

The annular body 5, which is formed from a plate-shaped member, comprises left and right leg portions 6 in a straddling state disposed radially inward and a two-mountain-shaped top portion 7 connecting the left and right leg portions 6, and is in the form of an arch. The left and right leg portions 6 are attached to the left and right elastic rings 4 which support the leg portions on the rim 1A. The annular body 5 has no support ability to support the inner surface of the tire when the tire is punctured, and may be formed of any of constituent materials if the annular body can maintain its shape during traveling of a vehicle (normal traveling of a vehicle in such a state that the noise reduction interior member 3 is spaced apart from the pneumatic tire 2). The constituent materials may include, for example, rigid materials such as metals, resins and the like.

The metals may include, for example, steel and aluminum. The resins may include thermoplastic resins and thermosetting resins. The thermoplastic resins may include nylon, polyester, polyethylene, polypropylene, polystyrene, polyphenylene sulfide, ABS and the like, and the thermosetting resins may include epoxy resin, unsaturated polyester resin, etc. The resins may be used alone or mixed with reinforcing fibers as fiber-reinforced resins. The resins are used more preferably than the metals in terms of weight saving.

Figure 2A:
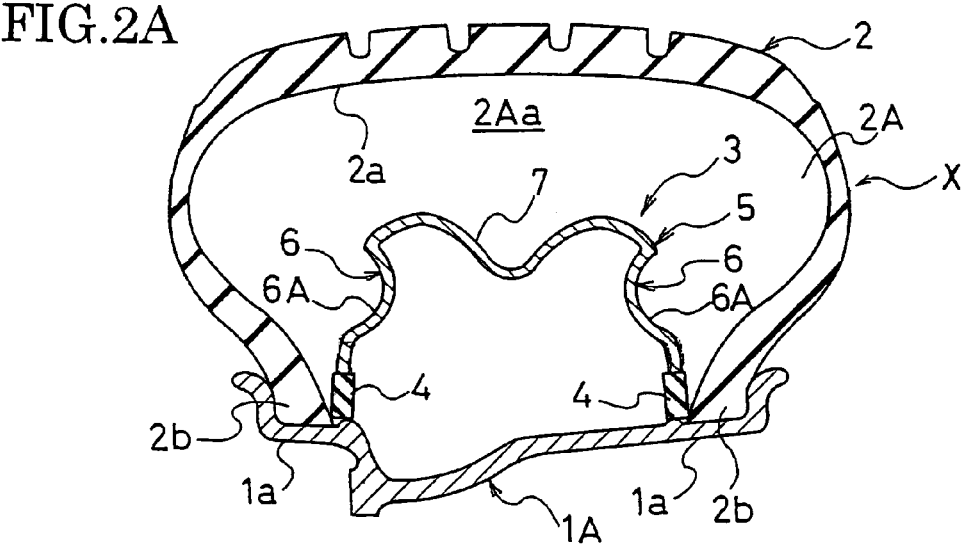
FIG. 2A is an enlarged cross-sectional view showing apart in the region A, C in FIG. 1, taken in a plane that contains the axis of rotation of the tire.
Figure 2B:
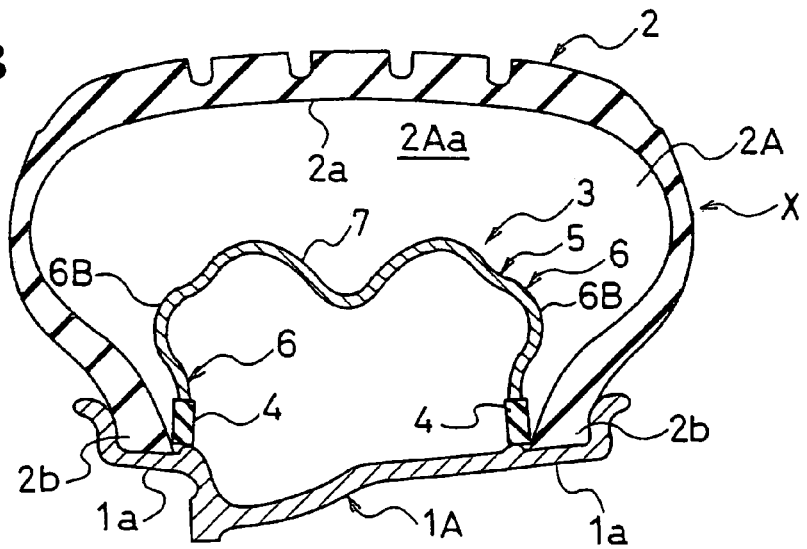
FIG. 2B is an enlarged cross-sectional view showing a part in the region B, D in FIG. 1, taken in a plane that contains the axis of rotation of the tire.

The two leg portions 6 have four regions A, B, C and D equally sectioned in the circumferential direction of the shell. In each of the regions A and C opposite to each other, the two leg portions 6 include cross-sectionally arc-shaped depressions 6A which are depressed inwardly and extend circumferentially, as shown in FIG. 2A, and in each of the regions B and D opposite to each other, the two leg portions 6 include cross-sectionally arc-shaped protrusions 6B which protrude outwardly and extend circumferentially, as shown in FIG. 2B. Thus the cross-sectional shape of each leg portion 6 varies periodically in the tire circumferential direction, whereby the cross-sectional area of an annular cavity portion 2Aa surrounded by the noise reduction interior member 3 and pneumatic tire 2 varies periodically in regular periods in the tire circumferential direction.

Figure 3A:
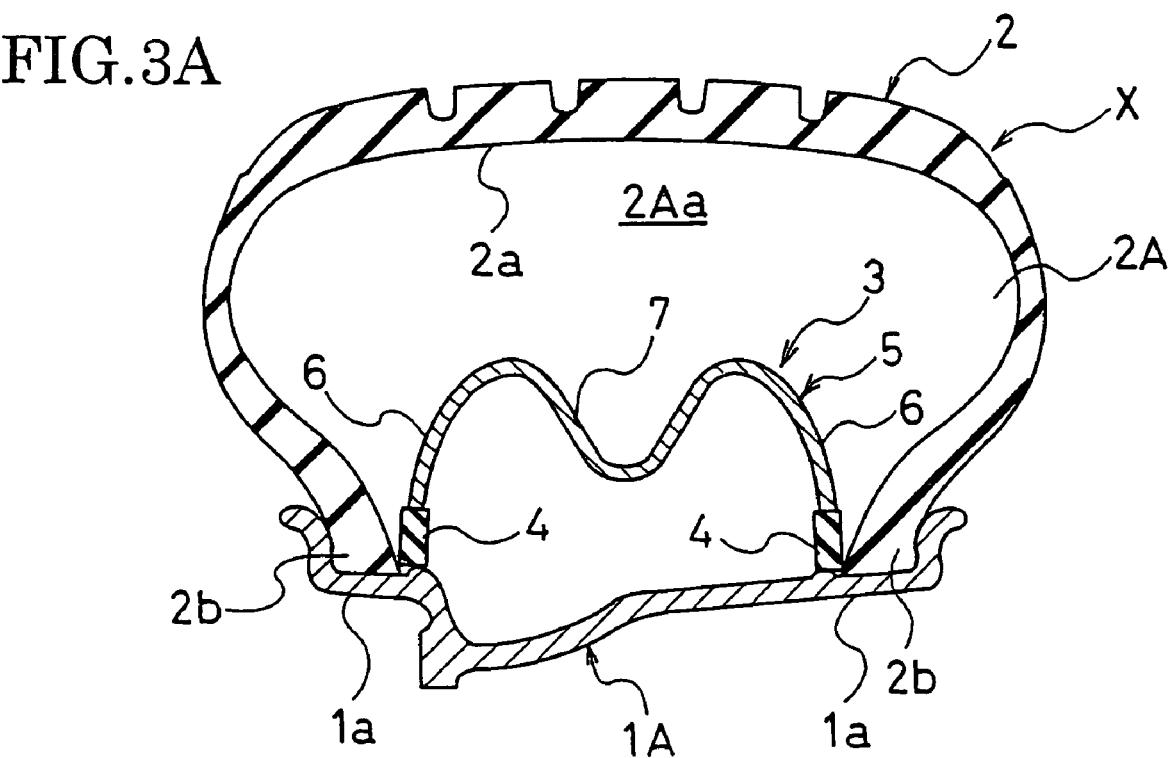
Figure 3B:
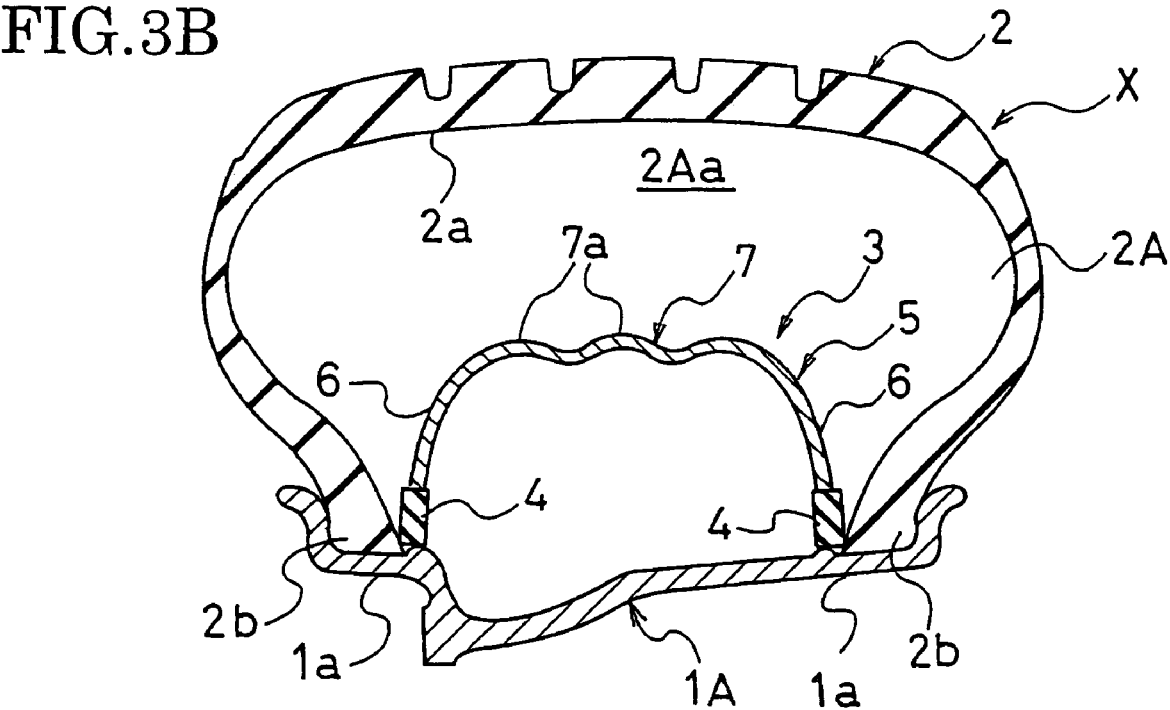

Alternatively, instead of the above leg portions 6, the two-mountain-shaped top portion 7 may be formed to have a circularly curved depression which is depressed deeply inward in each of the regions A and B as shown in FIG. 3A, and may be formed to have three circularly curved small protrusions 7a which protrude outwardly in each of the regions B and D as shown in FIG. 3B, whereby the cross-sectional shape of the top portion 7 varies periodically in the tire circumferential direction.

The annular body may also have a combination of these features. For example, the annular body 5 may be constructed so as to have a cross-sectional shape shown in FIG. 3A in the region A, a cross-sectional shape shown in FIG. 3B in the region B, a cross-sectional shape shown in FIG. 2A in the region. C, and a cross-sectional shape shown in FIG. 2B in the region D.

The annular body 5 may also be constructed such that the leg portions 6 and top portion 7 are provided with the depressions and protrusions stated supra, whereby the cross-sectional area of the cavity portion 2Aa surrounded by the annular body 5 and pneumatic tire 2 varies in the tire circumferential direction. In the embodiment shown in FIGS. 2A and 2B, the two leg portions 6 are provided with the depressions 6A and protrusions 6B. However, either of the two leg portions 6 may be provided therewith, and the annular body 5 may have a combination thereof.

The annular body 5 structured as described above can easily be obtained by forming annular body pieces divided according to the respective regions, and joining the annular body pieces by welding or the like.

The above-mentioned tire/wheel assembly can be assembled as follows. First, the noise reduction interior member 3 is fitted radially inwardly of the bead portions 2b of the pneumatic tire 2 from the axial direction of the tire with the center axis of the noise reduction interior member being orthogonal to the tire axis, and the noise reduction interior member 3 is then rotated by 90 degrees to insert it into the cavity 2A.

The pneumatic tire 2 with the noise reduction interior member 3 contained within the cavity 2A is assembled on the rim in the same assembling procedure as a normal pneumatic tire 2 to obtain the tire/wheel assembly having the noise reduction interior member 3 with the elastic rings 4 and the bead portions 2b of the pneumatic tire 2 being fitted on the rim seats 1a of the rim 1A.

According to the present invention mentioned above, the cross-sectional area of the annular cavity portion 2Aa surrounded by the noise reduction interior member 3 and pneumatic tire 2 is varied in the tire circumferential direction by the annular body 5, thereby allowing the frequency of air resonance caused in the cavity 2A to vary during traveling of a vehicle. Accordingly, road noise due to resonance of the air in the cavity 2A can be reduced.

Since the elastic rings 4 are fitted on the rim 1A, the noise reduction interior member 3 can be mounted on the rim before the normal assembly operation of a tire on a rim. Therefore, the operator does not have to insert his hands into the cavity in order to attach the noise reduction member. Consequently, the process of attaching the noise reduction interior member 3 is significantly improved.

In the embodiments of the present invention set forth hereinabove, when the cross-sectional area of the cavity portion 2Aa varies as stated supra, it is preferable that the cross-sectional area of the cavity portion 2Aa vary such that the maximum cross-sectional area thereof is 2% greater or more than the minimum cross-sectional area thereof. In the embodiments shown in the drawings, the maximum cross-sectional area exists in each of the regions A and C, and the minimum cross-sectional area exists in each of the regions B and D. The cross-sectional area of the cavity portion 2Aa in each of the regions A and C is 2% greater or more than the cross-sectional area thereof in each of the regions B and D. If the difference therebetween is less than 2%, it is difficult to effectively vary air resonance frequency. It is more preferable that the difference be 5% greater or more. The upper limit of the difference is preferably 20% or less in terms of workability of the annular body 5.

It is preferable that the forgoing annular body 5 be formed by forming annular body pieces divided in the circumferential direction thereof according to the respective regions, and joining the annular body pieces by welding or the like to easily produce the annular body, as described above, but it is not limited thereto. For example, the annular body may be integrally formed.

In cases where the annular body 5 is formed by joining the annular body pieces as mentioned above, there exist steps in the individual parts having depression and protrusion portions, whereby the annular body 5 has joint gaps through which the outside and inside of the annular body 5 are in communication with each other. The joint gaps may be left as they are, or may be closed using other materials. Preferably, the joint gaps are closed, thereby contributing to slightly decreasing road noise.

The annular body may be constructed such that the annular body pieces are formed to have no depressions or protrusions at opposing end thereof, and are joined without making steps.

It is preferable in terms of effectiveness that the cross-sectional area of the cavity portion 2Aa varies periodically as described above. However, it is not limited thereto, and the cross-sectional area of the cavity portion 2Aa may randomly vary in irregular periods.

When the cross-sectional area of the cavity portion 2Aa varies periodically, it is preferable to have two periods. In this case, as shown in the above embodiments of FIGS. 2 and 3, the annular body is preferably configured to vary in two periods in the order of the maximum cross-sectional area region, minimum cross-sectional region, maximum cross-sectional area region and minimum cross-sectional area region.

The depressions 6A and protrusions 6B of the leg portions 6 are in the forms of circular arcs in cross section in the embodiment described above, but if the cross-sectional area of the cavity portion 2Aa varies in the tire circumferential direction, any of shapes may be employed. The same goes for the top portion 7 shown in FIGS. 3A and 3B.

Figure 4:
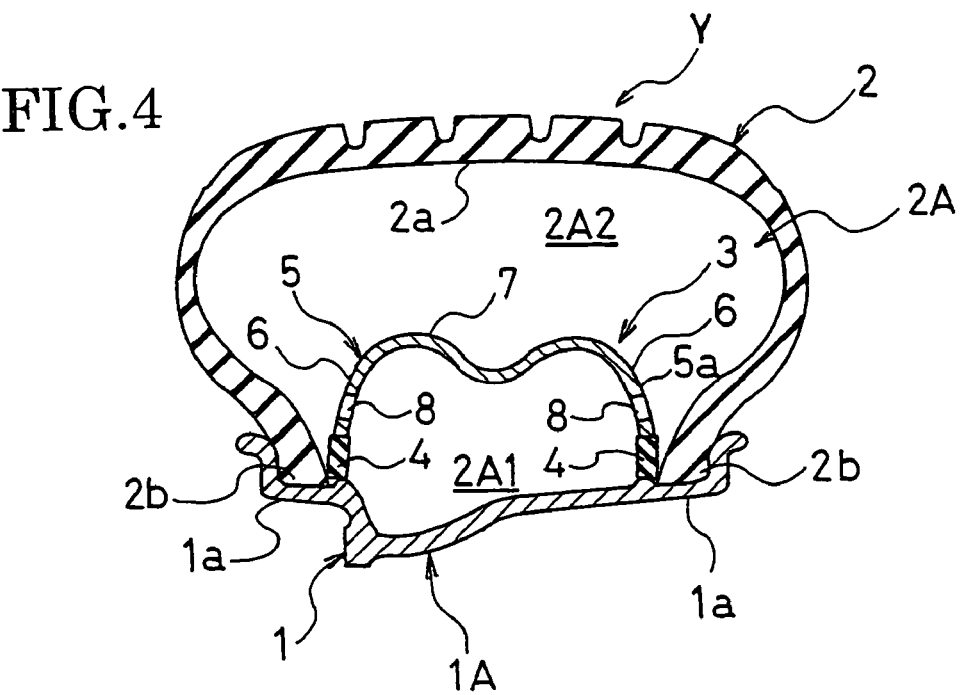
FIG. 4 is an enlarged cross-sectional view showing a main part of a tire/wheel assembly according to another alternative embodiment of the present invention, taken in a plane that contains the axis of rotation of the tire.
Figure 5:
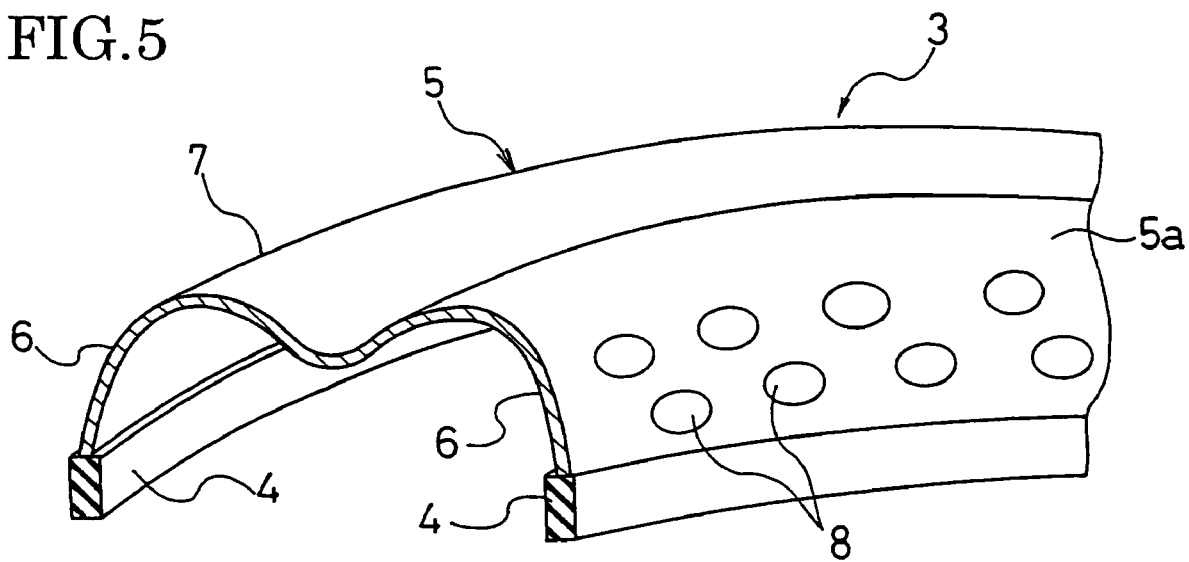
FIG. 5 is a partial enlarged fragmentary perspective view showing a main part of the noise reduction interior member in FIG. 4.

Referring to FIG. 4, there is shown another embodiment of a tire/wheel assembly according to the present invention. This tire/wheel assembly Y is constructed such that the annular body 5 has no depressions or protrusions but a plurality of openings 8 formed in the two leg portions 6 of the annular body 5 as shown in FIG. 5. The hermetically-closed inner cavity part 2A1 and hermetically-closed outer cavity part 2A2 of the cavity 2A defined by the noise reduction interior member 3 placed in the cavity 2A are communicatingly connected through the openings 8.

In the embodiment shown in the drawings, the annular body 5 has four regions A, B, C and D (see FIG. 1) equally sectioned in the circumferential direction thereof. The total opening area, on the outer surface 5a of the annular body 5, of openings 8 in each of the regions A and C is maximized, and the total opening area of openings 8 in each of the regions B and D is minimized. The maximum opening area regions A and C and the minimum opening area regions B and D are alternately placed, and the plurality of openings 8 are unevenly distributed such that the regions have openings 8 that are different in total opening area.

As mentioned above, the uneven distribution of the openings 8 in the equally sectioned regions A, B, C, and D allows the openings 8 and inner cavity part 2A1 to act as a Helmholtz resonance absorber, thereby absorbing and reducing resonance of the air in the cavity 2A of the pneumatic tire 2 during traveling of a vehicle. Accordingly, road noise due to resonance of the air in the cavity 2A of the pneumatic tire 2 can be improved. Since the elastic rings 4 are fitted on the rim 1A, the process of attaching the noise reduction interior member 3 can be significantly improved.

It is preferable that the regions A and C having the maximum total opening area of openings 8 be 5% to 10% greater in total opening area than the regions B and D having the minimum total opening area of openings 8. If the difference therebetween is less than 5%, it is difficult to provide effective absorption. If the difference is more than 10%, the mass of the noise reduction interior member 3 varies noticeably around the circumference thereof, whereby vibration may be caused.

It is preferable, in terms of obtaining the highest noise reduction effect, that the uneven distribution of the openings 8 be arranged such that the regions A and C having the maximum total opening area and the regions B and D having the minimum total opening area are alternately placed, as described above, to have two periods, but it is not limited thereto. The annular body 5 may be arranged such that the annular body 5 has two to seven regions equally sectioned in the circumferential direction thereof with regions having openings 8 that have a maximum total opening area being 5% to 10% greater in total opening area than a region having openings 8 that have a minimum total opening area. If the annular body has eight or more equally sectioned regions, it is not preferable because the distribution of the openings 8 is too close to an even distribution.

The openings 8 are elliptical in shape in the drawing shown, but are not limited thereto. The openings 8 may be of any shape such as circle, rectangle, square or the like if the openings can communicatingly connect the inner cavity part 2A1 and the outer cavity part 2A2.

The opening length of each opening 8 is preferably in the range of 3 mm to 6 mm. The opening length referred herein is as follows. In the case of an ellipse, a major axis and a minor axis are the opening lengths; in the case of a circle, a diameter is the opening length; in the case of a rectangle, square, etc., the length of a diagonal line passing through the center thereof is the opening length. If the opening length is less than 3 mm, it is difficult to provide an effectively absorbing function. If the opening length is more than 6 mm, the absorbing function is prone to decrease in a frequency range including the noise.

The entire opening area of all the openings 8 on the outer surface 5a of the annular body 5 is preferably in the range of 0.3% to 6.0% with respect to the entire area of the outer surface 5a of the annular body 5. If the entire opening area is less than 0.3%, it is not preferable in terms of an absorbing effect. If the entire opening area is more than 6.0%, it is not preferable because the difference of the total opening area between the regions is great, and the openings 8 are closer to each other in an openings-concentrated region, resulting in that the strength of the annular body may be insufficient for a centrifugal force when traveling at high speed.

In an annular body 5 having the above-mentioned openings 8 which are unevenly disposed, the equally sectioned regions are determined as regions sectioned at a position where there exists one region that is the largest in the total opening area of the openings 8a when lines by which the regions are equally sectioned are displaced from 0 to 360 degrees in the circumferential direction of the annular body.

In the above embodiments, the present invention exemplifies the top portion 7 structured in a two-mountain shape. However, the top portion may be formed in a one-mountain shape, three-mountain shape or the like, and further in triangle or the like, and the shape of the top portion is not limited to any particular shape.

EXAMPLE

Prepared were tire/wheel assemblies according to the present invention tire/wheel assemblies 1 to 3 (present invention assemblies 1 to 3), and comparison tire/wheel assemblies 1 and 2 (comparison assemblies 1 and 2), having a tire of size 205/55R16 and a rim of size 16×6½JJ, the present invention tire/wheel assembly 1 having a construction shown in FIGS. 2A and 2B in which the leg portions of the annular body had depressions and protrusions, the present invention tire/wheel assembly 2 having a construction shown in FIGS. 3A and 3B in which the top portion of the annular body had depressions and protrusions, the present invention tire/wheel assembly 3 having a construction shown in FIG. 4 in which the leg portions of the annular body had opening unevenly disposed therein, the comparison tire/wheel assembly 1 having the same construction as the present invention tire/wheel assembly 1 except that the leg portions of the annular body had no depressions or protrusions, the comparison tire/wheel assembly 2 having no noise reduction interior member.

In the present invention tire/wheel assemblies 1 and 2, the maximum cross-sectional area of the cavity portion is 4% greater than the minimum cross-sectional area thereof. In the present invention tire/wheel assembly 3, the difference between the maximum total opening area and minimum total opening area of openings in the regions was 7%.

The test tire/wheel assemblies were mounted on a passenger car of 2.5 liter displacement with the air pressure thereof being 200 kPa, and evaluation testing for road noise was conducted according to the following method. The results shown in Table 1 were obtained.

Road Noise

In a dry road test course, noise was measured in the car when the car was run straight at a speed of 50 km/h. The partial overall values in a frequency range of 100 Hz to 500 Hz were used to compare with each other. The results were represented on the basis of the comparison tire/wheel assembly 2 as standard. The smaller the value, the lower the road noise, and noise characteristics are better.

TABLE 1

| | Comparison Assembly 1 | Comparison Assembly 2 | Present Invention Assembly 1 | Present Invention Assembly 2 | Present Invention Assembly 3 |
| --- | --- | --- | --- | --- | --- |
| Road Noise | 0 dB | Standard | −1.1 dB | −1.3 dB | −1.6 dB |

As can be seen from Table 1, the tire/wheel assemblies of the present invention can improve road noise due to resonance of the air in the cavity of the pneumatic tire.

INDUSTRIAL APPLICABILITY

The tire/wheel assembly of the present invention having the aforementioned excellent effects can be very effectively utilized as a tire/wheel assembly which is to be mounted on a vehicle and has reduced noise due to resonance of the air in the cavity of the pneumatic tire.

What is claimed is:

1. A noise reduction interior member which is to be disposed in a cavity of a pneumatic tire mounted on a rim of a wheel, comprising:
    left and right elastic rings fitted to the rim; and
    an annular body attached between the elastic rings,
    wherein the annular body is configured such that an annular cavity portion surrounded by the noise reduction interior member and the pneumatic tire has a cross-sectional area that varies in a circumferential direction of the tire, the annular body has a cross-sectional shape which varies in a circumferential direction thereof, the annular body is formed by joining a plurality of annular body pieces into which the annular body is divided in a circumferential direction thereof, the annular body pieces have opposing leg portions, the opposing leg portions alternately protrude outwardly and inwardly from one body piece to the next adjacent body piece, and the noise reduction interior member is not adapted to support the wheel when the tire is punctured.

2. A noise reduction interior member according to claim 1, wherein the cross-sectional area of the annular cavity portion varies in such a manner that a maximum cross-sectional area thereof is 2% greater or more than a minimum cross-sectional area thereof.

3. A noise reduction interior member according to claim 1, wherein the cross-sectional area of the annular cavity portion varies periodically.

4. A noise reduction interior member according to claim 1, wherein the annular body comprises four regions equally sectioned in the circumferential direction thereof and the four equally sectioned regions comprise two first regions each making the cross-sectional area of the cavity maximum and two second regions each making the cross-sectional area of the cavity minimum, the first and second regions being alternately arranged.

5. A noise reduction interior member according to claim 4, wherein each equally sectioned region comprises a single annular body piece.

6. A tire/wheel assembly comprising:
a wheel having a rim;
a pneumatic tire mounted on the rim of the wheel, the pneumatic tire having a cavity; and
a noise reduction interior member disposed in the cavity of the pneumatic tire, the noise reduction interior member having left and right elastic rings fitted to the rim and an annular body attached between the elastic rings,
wherein the annular body is configured such that an annular cavity portion surrounded by the noise reduction interior member and the pneumatic tire has a cross-sectional area that varies in a circumferential direction of the tire,
wherein the annular body has a cross-sectional shape which varies in the tire circumferential direction, the annular body is formed by joining a plurality of annular body pieces into which the annular body is divided in a circumferential direction thereof, the annular body pieces have opposing leg portions, the opposing leg portions alternately protrude outwardly and inwardly from one body piece to the next adjacent body piece, and the noise reduction interior member is not adapted to support the wheel when the tire is punctured.

7. A tire/wheel assembly according to claim 1, wherein the cross-sectional area of the annular cavity portion varies in such a manner that a maximum cross-sectional area thereof is 2% greater or more than a minimum cross-sectional area thereof.

8. A tire/wheel assembly according to claim 1, wherein the cross-sectional area of the annular cavity portion varies periodically.

9. A tire/wheel assembly according to claim 1, wherein the annular body comprises four regions equally sectioned in the circumferential direction thereof and the four equally sectioned regions comprise at least first regions each making the cross-sectional area of the cavity maximum and at least second regions each making the cross-sectional areas of the cavity minimum which first and second regions are alternately arranged.

10. A tire/wheel assembly according to claim 9, wherein each equally sectioned region comprises a single annular body piece.

11. A tire/wheel assembly comprising:
a wheel having a rim;
a pneumatic tire mounted on the rim of the wheel, the pneumatic tire having a cavity; and
a noise reduction interior member disposed in the cavity of the pneumatic tire in such a manner that the noise reduction interior member divides the cavity of the pneumatic tire into an inner cavity part and an outer cavity part, the noise reduction interior member having left and right elastic rings fitted to the rim and an annular body attached between the elastic rings,
wherein the annular body has a plurality of openings through which the inner cavity part and outer cavity part are communicatingly connected, the annular body having regions equally sectioned in a circumferential direction thereof, the plurality of openings being unevenly distributed in such a manner that the regions have openings which are different in total opening area,
wherein the equally sectioned regions consist of four regions into which the annular body is equally sectioned in the circumferential direction thereof, the four equally sectioned regions consisting of two first regions having openings that are maximum in total opening area and two second regions having openings that are minimum in total opening area, the first and second regions being alternately placed, the total opening area in the first regions being 5% to 10% greater than the total opening area of the openings in the second regions, the first and second region openings having a length in the range of 3 mm to 6 mm.

12. A tire/wheel assembly according to claim 11, wherein the annular body has an outer surface, an entire opening area of all the openings on the outer surface of the annular body being 0.3% to 6.0% with respect to an area of the outer surface of the annular body.

13. A noise reduction interior member which is to be disposed in a cavity of a pneumatic tire mounted on a rim of a wheel, comprising:
left and right elastic rings fitted to the rim; and
an annular body attached between the elastic rings,
wherein the annular body has a plurality of openings, the annular body having regions equally sectioned in a circumferential direction thereof, the plurality of openings being unevenly distributed in such a manner that the regions have openings which are different in total opening area,
wherein the equally divided regions consist of four regions into which the annular body is equally divided in the circumferential direction thereof, the four equally divided regions comprising two first regions having openings that are maximum in total opening area and two second regions having openings that are minimum in total opening area, the first and second regions being alternately placed, the total opening area in the first regions being 5% to 10% greater than the total opening area of the openings in the second regions, the first and second region openings having a length in the range of 3 mm to 6 mm, and
the noise reduction interior member is not adapted to support the wheel when the tire is punctured.

14. A noise reduction interior member according to claim 13, wherein the annular body has an outer surface, an entire opening area of all the openings on the outer surface of the annular body being 0.3% to 6.0% with respect to an area of the outer surface of the annular body.

* * * * *